Oct. 13, 1953  B. EBIN  2,655,096
MEAT BROILING APPARATUS
Filed Sept. 7, 1949  4 Sheets-Sheet 1
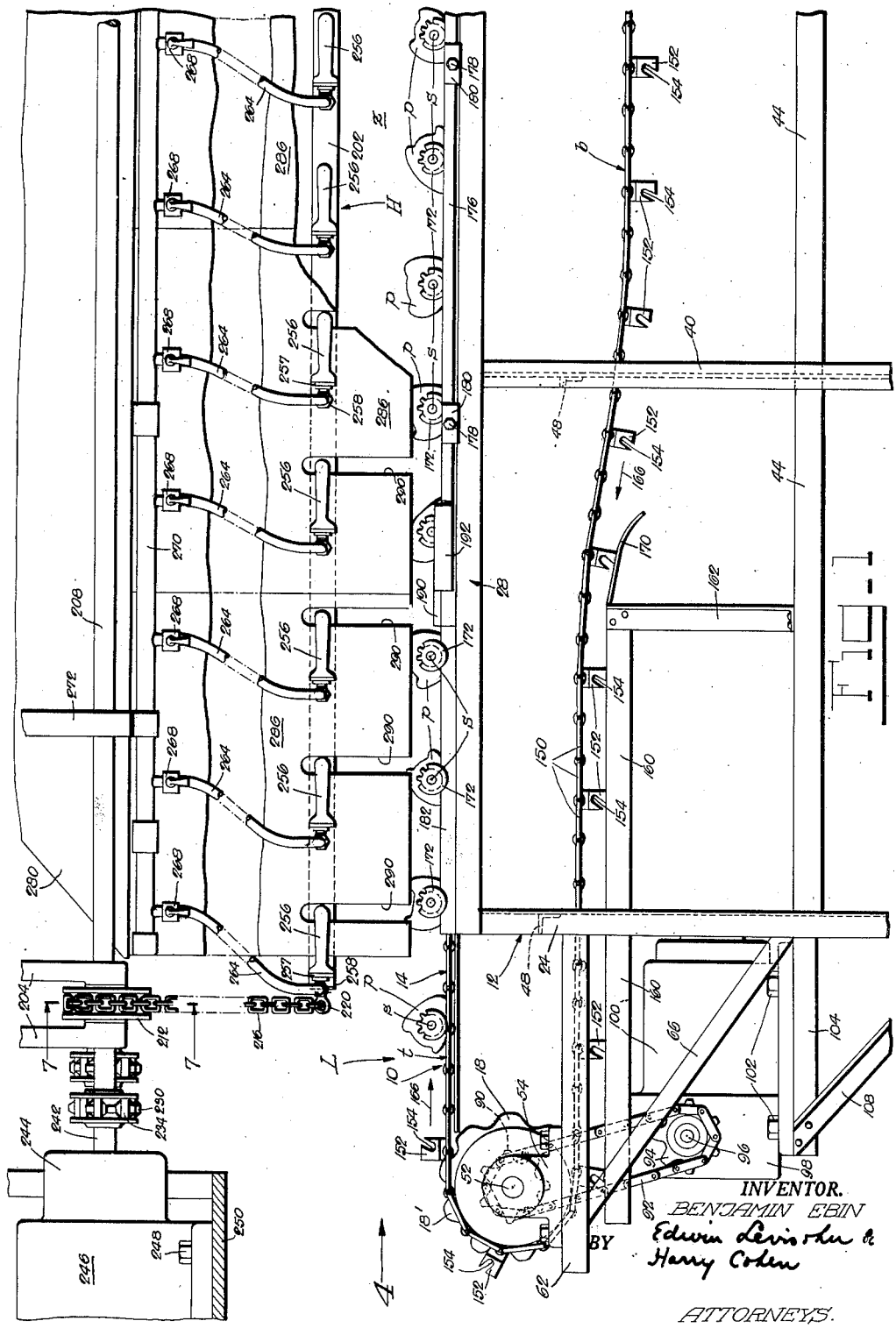
INVENTOR.
BENJAMIN EBIN
BY Edwin Levinthur &
Harry Cohen
ATTORNEYS.

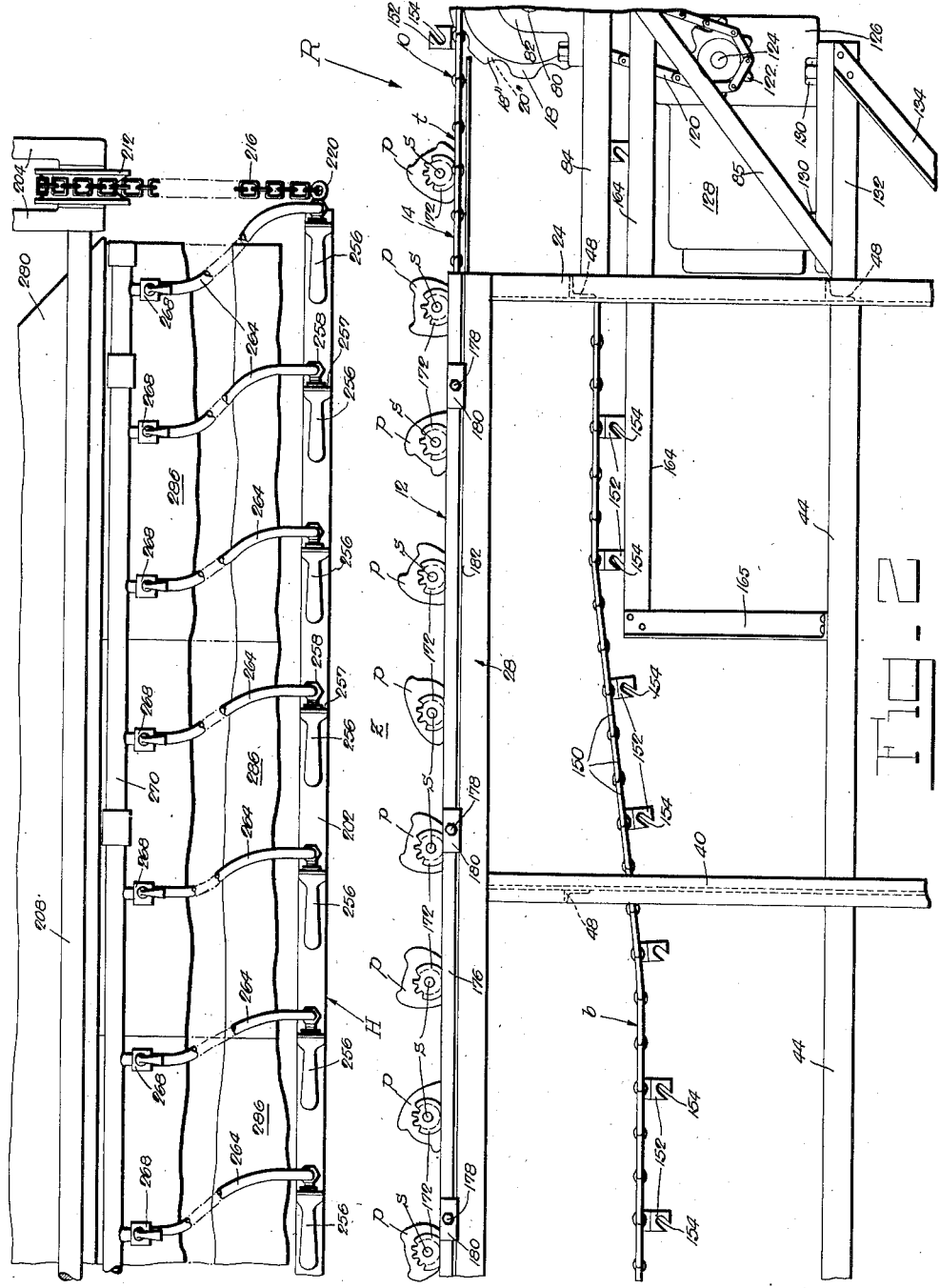

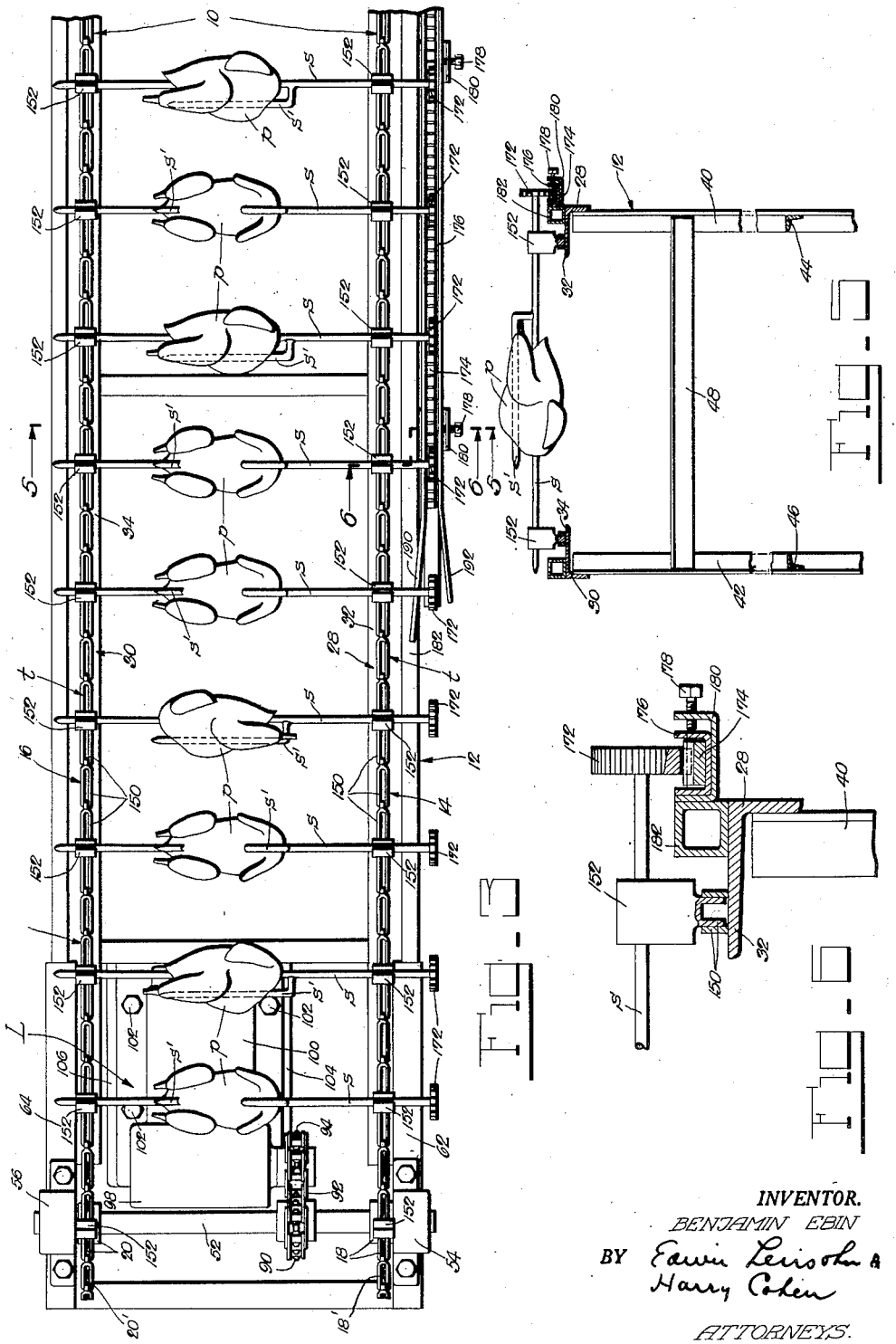

Oct. 13, 1953
B. EBIN
2,655,096
MEAT BROILING APPARATUS
Filed Sept. 7, 1949
4 Sheets-Sheet 4
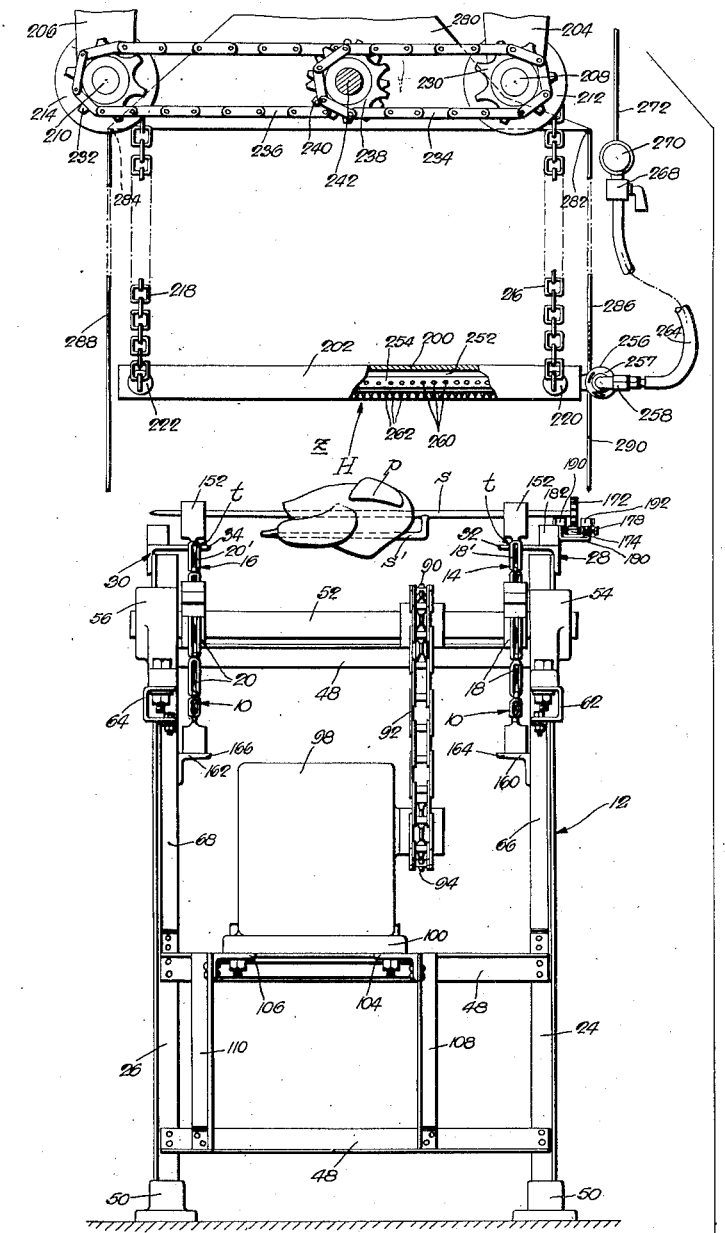
INVENTOR.
BENJAMIN EBIN
BY Edwin Leinster &
Harry Cohen
ATTORNEYS.

Patented Oct. 13, 1953

2,655,096

UNITED STATES PATENT OFFICE 2,655,096

MEAT BROILING APPARATUS

Benjamin Ebin, New York, N. Y.

Application September 7, 1949, Serial No. 114,313

3 Claims. (Cl. 99—421)

This invention relates to apparatus for broiling meats of all kinds, and especially poultry.

It is an object of the present invention to provide apparatus of this type in which meat will uniformly be broiled while being advanced in a continuous motion from one to the other end of the apparatus, and which requires little skill and effort on the part of an attendant constantly to supply meat to the apparatus for most efficient performance of the latter at maximum capacity, thereby to render the apparatus particularly suitable for broiling meats for commercial purposes.

It is another object of the present invention to provide apparatus of this type with laterally spaced endless conveyors of which the substantially horizontal top runs extend lengthwise of the apparatus on opposite sides, respectively of a heated broiling zone, and also with longitudinally spaced provisions for removably supporting thereon the top runs of the conveyors and in bridging relation therewith a multitude of spits, respectively, on which meat has previously been impaled by an attendant or attendants.

It is another object of the present invention to locate the heat source for the broiling zone above the conveyors, and to provide for automatic turning of the meat-carrying spits as they are advanced through the apparatus by the top runs of the conveyors, so as evenly to expose all sides of the meat to the heat source.

It is another object of the present invention to provide for adjustment of the heat source toward and away from the conveyors, thereby to permit regulation of the temperature in the heated zone for the correct broiling of different meats during their passage through the apparatus at an efficient speed, or to permit the broiling in the apparatus of meats of different sizes, such as different kinds of poultry, for instance.

It is another object of the present invention to provide apparatus of this type which is of simple and rugged construction, lends itself to ready assembly and installation, as well as to ready repair or ready replacement of parts, if necessary, and permits ready inspection of meat being broiled anywhere on its passage through the apparatus.

The above and other objects, features and advantages of the present invention will be more fully understood from the following description considered in connection with the accompanying illustrative drawings.

In the drawings:

Figs. 1 and 2 together are a side-elevational view of apparatus embodying the present invention;

Fig. 3 is a fragmentary top plan view of a part of the same apparatus;

Fig. 4 is an end elevation of the apparatus as viewed in the direction of the arrow 4 in Fig. 1;

Fig. 5 is a fragmentary section taken on the line 5—5 of Fig. 3;

Fig. 6 is an enlarged fragmentary section taken on the line 6—6 of Fig. 3; and

Fig. 7 is a section taken on the line 7—7 of Fig. 1.

Referring to the drawings, the reference numeral 10 designates an endless conveyor which is carried by a frame 12 and adapted to convey meat to be broiled through a heated zone z. The conveyor 10 comprises laterally spaced endless chains 14 and 16 which are passed over pairs of sprockets 18 and 20, respectively.

The frame 12, being in the present instance articulated, comprises on the opposite sides of the apparatus end legs 24 and 26, respectively, to the upper ends of which are suitably secured, as by welding, side rails 28 and 30, respectively, that may conveniently be in the form of angles of which the respective horizontal flanges 32 and 34 serve as supporting tracks for the top runs t of the conveyor chains 14 and 16, respectively. The side rails 28 and 30 are preferably further supported by intermediate legs 40 and 42, respectively (Figs. 1, 2 and 5). The frame 12 is, in the present instance, reinforced longitudinally thereof by rails 44 and 46 (Figs. 1, 2 and 5) which are suitably secured, as by welding, to the legs on the opposite sides, respectively, of the frame. Crossbraces 48 are also provided between the opposite legs of the frame 12 (Figs. 1 to 4) for further reinforcement of the latter. The end legs 24, 26 and intermediate legs 40, 42 of the frame 12 are preferably seated with their lower ends in suitable shoes 50, respectively, by means of which the frame 12 is firmly mounted on the floor (Fig. 4).

The front sprockets 18' and 20', over which pass the conveyor chains 14 and 16, respectively, are mounted on a shaft 52 (Figs. 1 and 3) which is journalled with its ends in suitable bearing brackets 54 and 56 on support rails 62 and 64, respectively. The support rails 62 and 64, which may conveniently be in the form of U-shaped channels as shown in Fig. 4, project forwardly from, and are suitably secured to, the front legs 24 and 26, respectively, of the frame 12. The support rails 62 and 64 may be reinforced by side braces 66 and 68, respectively (Figs. 1 and 4).

The rear sprockets 18" and 20", being mounted similarly as the front sprockets 18' and 20', are carried by a shaft 80 (Fig. 2) which is journalled with its ends in spaced bearing brackets 82 on support rails 84 which project rearwardly from and are suitably secured to the adjacent end legs 24 and 26, respectively, on the frame 12. The support rails 84 may be reinforced by side braces 86, respectively.

Due to the considerable longitudinal extent of the conveyor chains 14 and 16, the front sprockets 18' and 20', as well as the rear sprockets 18" and 20", are driven clockwise as viewed in Figs. 1 and 2, respectively, in order to prevent undue tension in the conveyor chains. To this end, the sprocket shaft 52 at the front of the apparatus carries a further sprocket 90 (Figs. 1, 3 and 4) which through a chain 92 is drivingly connected with a sprocket 94 on the slow shaft 96 of a reduction gearing 98 on an electric motor 100. The motor 100 may suitably be mounted at 102 on spaced support rails 104 and 106 (Figs. 1 and 4) which project forwardly from and are suitably secured to the adjacent cross-brace 48 of the frame 12. The support rails 104 and 106 may be reinforced by suitable side braces 108 and 110, respectively. The rear sprockets 18" and 20" may be driven similarly as the front sprockets 18' and 20'. To this end, the shaft 80 (Fig. 2) carries another sprocket (not shown) which through a chain 120 is drivingly connected with a sprocket 122 on the slow shaft 124 of a reduction gearing 126 on an electric motor 128. The motor 128 may suitably be mounted at 130 on spaced support rails 132 which project from and are suitably secured to the adjacent cross brace 48. The support rails 132 may be reinforced by suitable side braces 134, respectively.

Each conveyor chain is formed by pivotally connected links 150 of any suitable construction, of which regularly recurring ones are provided with bearing blocks 152, respectively, which are adapted for the rotary support of spits s on which meat, such as poultry p, for instance, has previously been impaled (Fig. 3). To this end, the bearing blocks 152 are arranged on the conveyor chains 14 and 16 in opposite pairs of which each pair is adapted for the reception of a spit s in the manner shown in Fig. 3 in which the spit bridges the gap between the conveyor chains and presents the poultry thereon to the broiling zone z substantially in the center thereof where the heat is most intense. The spits s are in the form of round rods, and the bearing blocks 152 are provided with grooves 154, respectively, for the ready removable placement therein of the spits s for their rotary support on the conveyor chains 14 and 16. Each spit s is, in the present instance, provided with a laterally offset prong s' on which the poultry is also impaled so that it will turn with the spit.

Preferably, substantial lengths of the bottom runs b of the conveyor chains 14 and 16 are also supported so as to reduce the tensile stresses in the latter to such an extent that they need not be overly strong and accordingly bulky. To this end, substantial lengths of the bottom runs b of the conveyor chains 14 and 16 are at the front of the apparatus supported on tracks 160 and 162, respectively, which may suitably be secured to the adjacent end legs 24 and 26, respectively, of the frame 12 (Figs. 1 and 4). Conveniently, the tracks 160 and 162 may be in the form of angles (Fig. 4) on the top flanges 164 and 166 of which the adjacent portions of the chains 14 and 16, respectively, are supported with their bearing blocks 152 in the fashion shown in Fig. 1. The tracks 160 and 162 may be reinforced by upright braces 162, respectively (Fig. 1). Similar lengths of the bottom runs b of the chains 14 and 16 are at the rear of the apparatus (Fig. 2) supported with their bearing brackets 152 on tracks 164, respectively, which may be mounted, in a similar manner as the tracks 160 and 162, on the adjacent end legs 24 and 26, respectively, of the frame 12. The tracks 164 may be reinforced by vertical braces 165, respectively. Inasmuch as the conveyor chains 14 and 16 travel in the direction of the arrows 166 in Fig. 1, the top flanges 164 and 166 of the tracks 160 and 162, respectively, are preferably extended at the rear thereof to form arcuate track extensions 170, respectively (Fig. 1), which guide the bearing blocks 152 on the bottom runs b of the chains onto the respective tracks 160 and 162.

Provisions are also made to turn the spits s in their respective bearing blocks 152 during their travel with the top runs t of the conveyor chains 14 and 16. To this end, each spit s carries at one end thereof a gear 172 which is adapted to cooperate with a rack 174 that extends along one side of the frame 12 (Fig. 3). The rack 174 is mounted in any suitable manner in a channel-like holder 176 (Figs. 3 and 6) which is clamped at 178 in spaced support brackets 180, suitably secured, as by welding, to a rail 182 which is itself suitably mounted on the adjacent side rail 28 of the frame 12. In placing in the described manner spits s on the conveyor 10 at the loading station L thereof (Figs. 1 and 3), the attendant makes sure that the gears 172 on the spits are on the same side of the frame 12 as the rack 174, and furthermore shifts the spits in their respective bearing blocks 152 so that the gears 172 thereon are in approximate alignment with the rack 174. Nevertheless, leading lengths of the side walls of the rack holder 176 are oppositely flared as at 190 and 192, respectively (Fig. 3), in order to direct the gears 172 of displaced spits s on the conveyor 10 safely into meshing relation with the rack 174. The rack 174 extends substantially to the rear end of the frame 12 so that the spits s are turned while passing to the very end of the broiling zone z. The spits s with the broiled poultry p thereon are, after their passage through the broiling zone z of the apparatus, removed from the conveyor 10 at the station R (Fig. 2), preferably by an attendant to assure careful handling of the prepared poultry and avoid damage to the same, such as might occur if the spits s were permitted to drop by gravity from their respective bearing blocks 152 during the passage of the conveyor chains 14 and 16 around the rear sprockets 18" and 20".

The broiling zone z has for its heat source an overhead heater H (Figs. 1, 2 and 4) which comprises, in the present instance, a plurality of flame-heated ceramic blocks 200 (Fig. 4) that are suitably mounted side by side in a longitudinal frame 202. The heater frame 202 is vertically adjustably suspended to permit regulation of the temperature in the broiling zone z for the correct broiling therein of different kinds of meat, and also of meats of different sizes, such as different kinds of poultry, for instance. To this end, there are suspended, from the ceiling, for instance, on opposite sides of the heater frame 202 pairs of spaced brackets 204 and 206, respectively (Figs. 1, 2 and 4) in which are journalled shafts 208 and 210, respectively. Carried on the ends of the shafts 208 and 210 are wheels 212 and 214, respectively, from which depend chains 216 and 218, respectively, which are attached at 220 and 222 to the ends of the heater frame 202 adjacent the opposite sides thereof, respectively. The chains 216 and 218 may be secured to their respective wheels 212 and 214, in the manner shown in Fig. 7, i. e., by means of a screw 224 which may pass through an elongated end link 226 of the chain and be threadedly received in the wheel. The heater frame 202 is thus suspended on the chains 216 and 218 substantially at its four corners.

The forward ends of the shafts 208 and 210 carry sprockets 230 and 232, respectively, which through chains 234 and 236 are drivingly connected with sprockets 238 and 240, respectively, on the slow shaft 242 of a reduction gearing 244 on an electric motor 246 which is mounted at 248 on a suitably suspended platform 250. Thus, on operating the motor 246 to drive the slow shaft 242 of the reduction gearing 244 clockwise as viewed in Fig. 4, the heater frame 202 will be lowered. Conversely, on driving the shaft 242 in the opposite direction, the heater frame 202 will be raised. The described mounting of the suspension chains 216 and 218 on their respective wheels 212 and 214 (Fig. 7) permits vertical adjustment of the heater frame 202 within the required limits.

Each ceramic block 200 is provided with a longitudinal passage 252 (Fig. 4) into which projects a burner pipe 254 which has on the outside of the frame 202 a conventional head 256 (Fig. 1) wherein to admit through a turnable valve disc 257 atmospheric air in regulatable amounts for intermixing with any suitable gaseous fuel which is admitted into the head 256 at an inlet 258 thereof. The burner pipe 254 is provided with a multitude of orifices 260 (Fig. 4) through which the mixture of gaseous fuel and air escapes and burns to heat the ceramic block. Each ceramic block 200 is for maximum heat radiation formed at its bottom with a multitude of projecting pins 262. The fuel inlets 258 of the burner heads 256 are connected through flexible conduits 264, respectively, with manually operable valves 268, respectively, on a gas main 270 which may suitably be suspended from the ceiling by suitable hangers 272.

Suitably suspended from the ceiling, for instance, is a hood 280 (Figs. 1, 2 and 4) into which pass the products of combustion from the heater H from where they may escape through a suitable flue (not shown). Preferably hingedly suspended from the opposite sides of the hood 280, as at 282 and 284, respectively (Fig. 4), are baffle plates 286 and 288, respectively, which extend throughout the longitudinal extent of the apparatus preferably to the lower limit of the broiling zone z so as to prevent undue escape of heat therefrom. The baffle plates 286 on the side of the burner heads 256 are slotted as at 290 (Fig. 1) to clear the latter in any vertically adjusted position of the heater frame 202.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. Meat-broiling apparatus, comprising laterally spaced endless conveyors having substantially horizontal top runs, respectively, on a level with and on opposite sides, respectively, of a broiling zone, at least one spit adapted to be carried by said conveyors, longitudinally spaced and transversely aligned supports carried by said conveyors and arranged to form opposed pairs on said conveyors for removably carrying said spit in bridging relation with said conveyors, another support vertically spaced above said top runs of the conveyors, heating means suspended from said other support and adapted to heat said broiling zone, means for vertically adjusting said other support relative to said horizontal top runs of said conveyors whereby to vertically adjust said heating means so as to regulate the temperature in said broiling zone, and driving means for said conveyors, a rack extending on the outside of said conveyors parallel to the adjacent top run thereof and being adapted to mesh with gears on the adjacent ends of said spit on said support pairs, and guide structure for preventing axial movement of the spit gears from said rack.

2. Meat-broiling apparatus, comprising laterally spaced endless conveyors having substantially horizontal top runs, respectively, on a level with and on opposite sides, respectively, of a broiling zone, at least one spit adapted to be carried by said conveyors, longitudinally spaced and transversely aligned supports carried by said conveyors and arranged to form opposed pairs on said conveyors for removably carrying said spit in bridging relation with said conveyors, another support vertically spaced above said top runs of the conveyors, heating means suspended from said other support and adapted to heat said broiling zone, means for vertically adjusting said other support relative to said horizontal top runs of said conveyors whereby to vertically adjust said heating means so as to regulate the temperature in said broiling zone, driving means for said conveyors, a rack extending on the outside of said conveyors parallel to the adjacent top run thereof and being adapted to mesh with gears on the adjacent ends of said spit on said support pairs, and guide structure for preventing axial movement of the spit gears from said rack, and means for guiding the spit gears onto said rack during their travel with said conveyors, said last mentioned means being positioned beyond the adjacent end of said rack.

3. Meat-broiling apparatus, comprising laterally spaced endless conveyors having substantially horizontal top runs, respectively, on a level with and on opposite sides, respectively, of a broiling zone, at least one spit adapted to be carried by said conveyors, longitudinally spaced and transversely aligned supports carried by said conveyors and arranged to form opposed pairs on said conveyors for removably carrying said spit in bridging relation with said conveyors, another support vertically spaced above said top runs of the conveyors, heating means suspended from said other support and adapted to heat said broiling zone, means for vertically adjusting said other support relative to said horizontal top runs of said conveyors whereby to vertically adjust said heating means so as to regulate the temperature in said broiling zone, driving means for said conveyors, a rack extending on the outside of said conveyors parallel to the adjacent top run thereof and being adapted to mesh with gears on the adjacent ends of a spit on said support pairs, and a guide having surfaces extending parallel to and on opposite sides, respectively, of said rack and adapted to prevent axial movement of the spit gears from said rack, the entrance to said guide being formed by oppositely diverging extensions of said surfaces, respectively, beyond the adjacent end of said rack, and adapted to guide the spit gears onto said rack during their travel with said conveyors.

BENJAMIN EBIN.

References Cited in the file of this patent

UNITED STATES PATENTS

| Number | Name | Date |
|---|---|---|
| 250,961 | Parker | Dec. 13, 1881 |
| 784,854 | Grace | Mar. 14, 1905 |
| 1,258,245 | Riegel | Mar. 5, 1918 |
| 1,634,142 | Hammond | June 28, 1927 |
| 1,768,172 | Triplett | June 24, 1930 |
| 1,771,762 | Allwine | July 29, 1930 |
| 2,027,930 | Padelford | Jan. 14, 1936 |
| 2,142,390 | Zerr | Jan. 3, 1939 |
| 2,163,165 | Wise | June 20, 1939 |
| 2,182,734 | O'Dowd | Dec. 5, 1939 |
| 2,259,073 | McGlaughlin | Oct. 14, 1941 |
| 2,333,175 | Henley | Nov. 2, 1943 |
| 2,334,847 | Spiers | Nov. 23, 1943 |
| 2,339,974 | Austin | Jan. 25, 1944 |
| 2,470,645 | Reichart | May 17, 1949 |
| 2,485,890 | Keljik | Oct. 25, 1949 |
| 2,506,318 | Steriss | May 2, 1950 |
| 2,533,080 | Alexander | Dec. 5, 1950 |
| 2,577,963 | Hagopian | Dec. 11, 1951 |